April 9, 1935. J. E. DUNCAN, JR., ET AL 1,996,910
MANUFACTURE OF GLASSWARE
Filed March 24, 1933 4 Sheets-Sheet 2

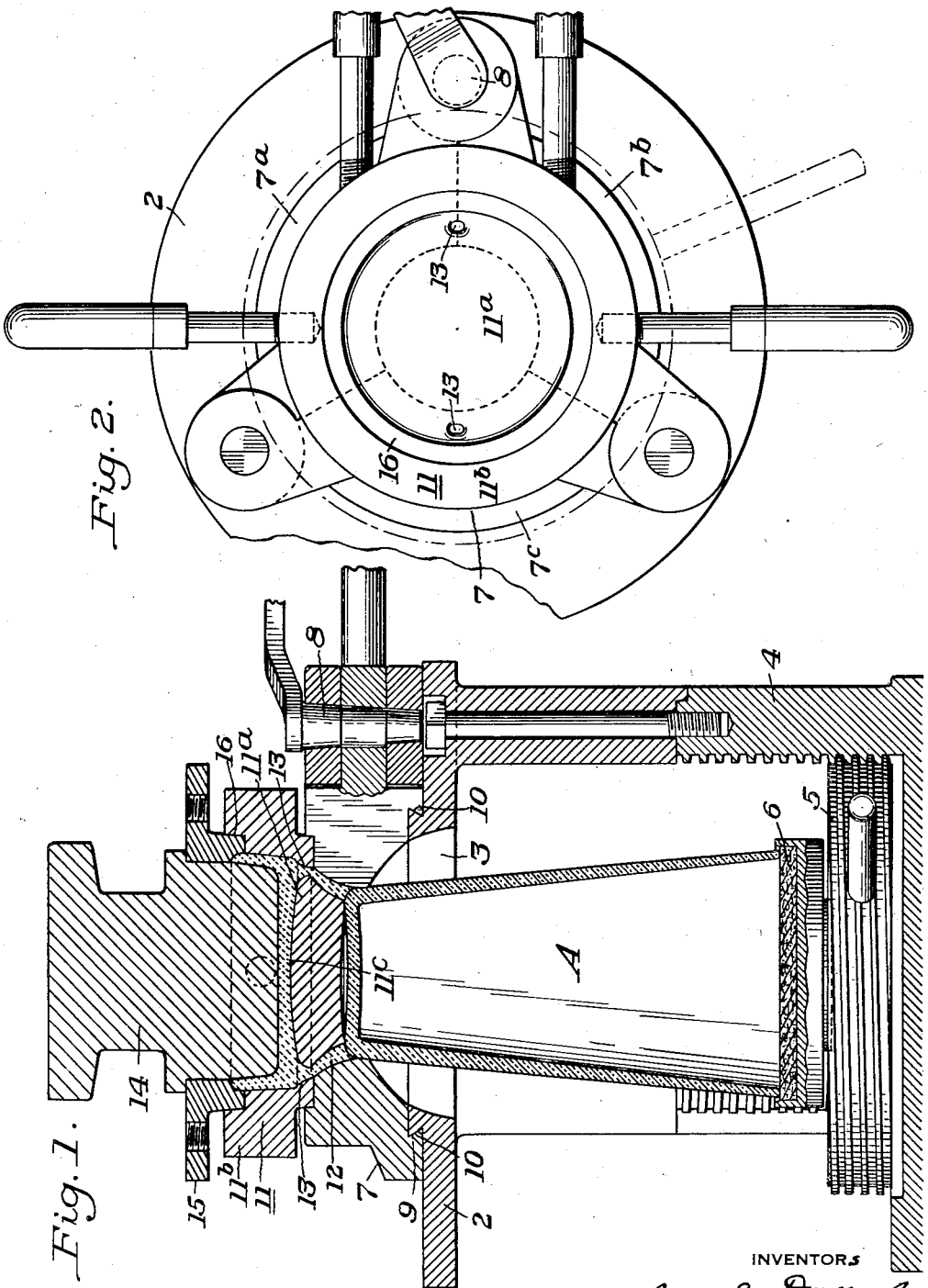

INVENTORS
James E. Duncan, Jr.
William W. Reese
by their attorneys

April 9, 1935.  J. E. DUNCAN, JR., ET AL  1,996,910
MANUFACTURE OF GLASSWARE
Filed March 24, 1933   4 Sheets-Sheet 3
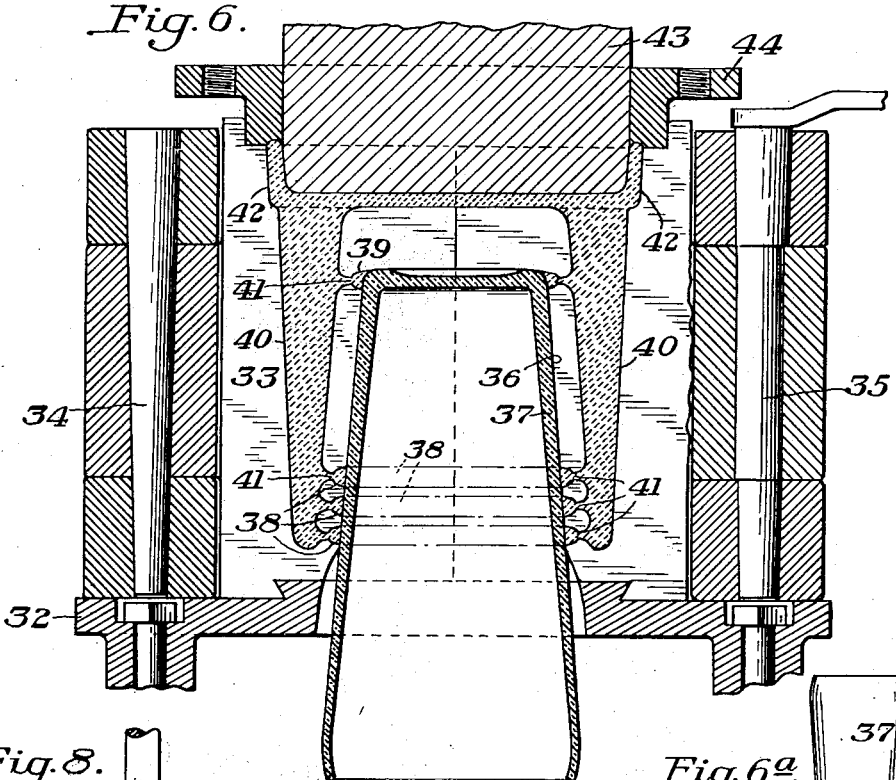
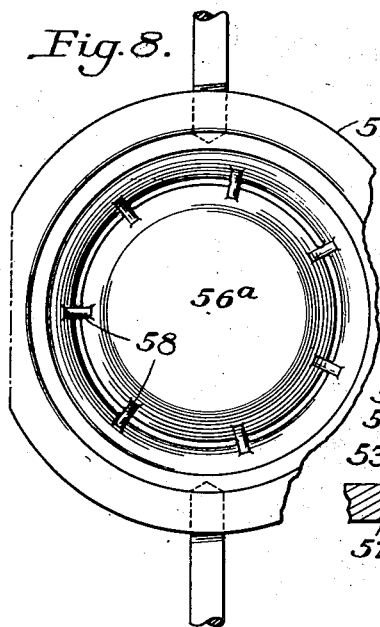
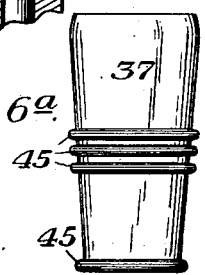
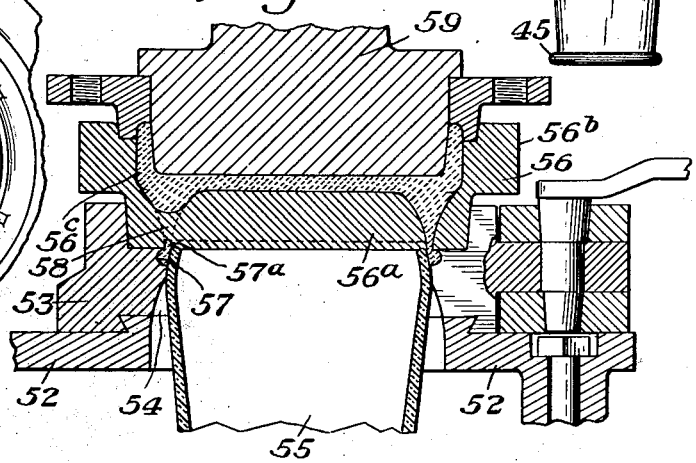
INVENTORS

UNITED STATES PATENT OFFICE 1,996,910

MANUFACTURE OF GLASSWARE

James E. Duncan, Jr. and William W. Reese, Washington, Pa., assignors to The Duncan & Miller Glass Company, Washington, Pa., a corporation of Pennsylvania Application March 24, 1933, Serial No. 662,440

8 Claims. (Cl. 49—66)

This invention relates to the manufacture of glassware, particularly table and ornamental glassware, and relates especially to the manufacture of that type of glassware in which a single article is comprised of parts of contrasting glass, as for instance, articles having a body of one color or kind of glass and a decoration or other part of a different kind of color of glassware.

In the manufacture of footed tumblers, for instance, it has heretofore been the practice to either make the body and the foot portion separate and fuse them together, or to make the body portion of the tumbler, then put the body in a mold, drop a gob of colored glass onto the bottom of the glass body, and mold this gob of colored glass. When the colored glass has been applied as a band around the outside of a glass body, it has heretofore been the practice to apply the band by forming a ribbon of colored glass, softening it, and applying it by hand while in the soft condition to the body of the object to be decorated, letting it fuse onto the body. This is sometimes referred to as "stringing".

According to the present invention, an improvement is provided in the application of glass of a contrasting character or color to the main body of the object wherein the glass to be applied to the object is forced under pressure from a holding receptacle through openings into a mold cavity, the body of the object to be decorated forming a wall of the cavity. The glass flowing under pressure enters this cavity, fills it, and fuses to the body of the object. Decorative effects can be secured through this invention which are superior to those obtainable by other methods and at a cost which is relatively cheaper than the hand methods of decoration.

The invention may be readily understood by reference to the accompanying drawings, which illustrate various typical embodiments of our invention, and in which:

Figure 1 illustrates the step of applying a flanged or footed base to a previously formed glass body, the view representing a vertical section through the molding and extruding apparatus, the object to be decorated also being shown in section;

Figure 2 is a top plan view of the apparatus shown in Fig. 1, the plunger, however, being withdrawn from the receiving shell;

Figure 6 is a view similar to Fig. 1 illustrating the application of colored beads to various portions of a glass object such as a tumbler;

Figure 7 is a partial sectional view similar to Fig. 1 showing the application of a bead to the lip of a tumbler or other object;

Figure 8 is a top plan view of the apparatus shown in Fig. 7, the plunger, however, being omitted;

Figure 4:
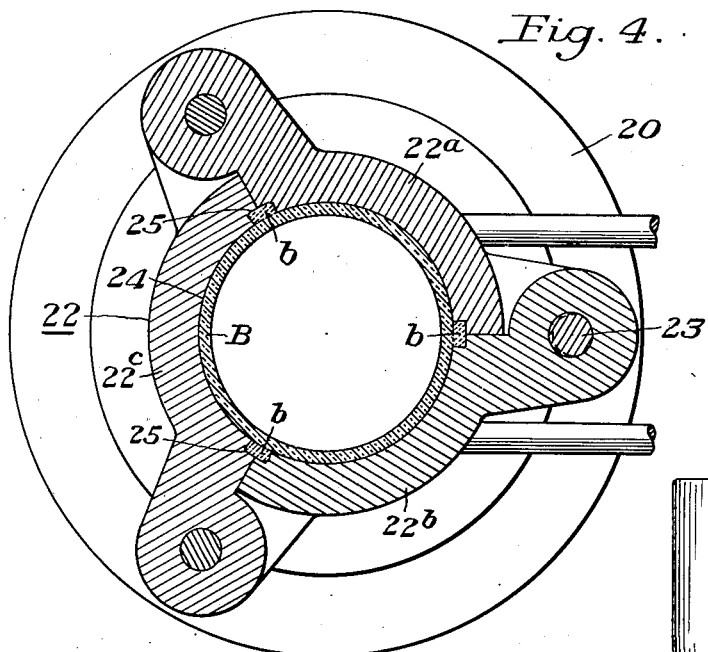
Figure 4 is a transverse section in the plane of line IV—IV of Fig. 3.

In carrying out our invention, the body of the glass object may be formed by pressing or blowing in accordance with the usual practice. For the purpose of illustration we have shown in Fig. 1 the glass body as comprising a tumbler A which has been previously formed, but it will be understood that in place of the tumbler any other hollow glass object may be substituted.

According to our invention, the portion of the tumbler to be decorated is confined in a mold, and a receiver is provided for receiving the molten glass with which the body of the object is to be decorated or supplemented. A plunger entering this receiver forces or extrudes the molten glass through gates into the mold cavity where the glass comes into contact with the portion of the object to be ornamented or supplemented, fusing onto such glass, the glass filling the mold cavity.

In Fig. 1 the apparatus illustrated for effecting the invention comprises a table or support 2 having an opening 3 therein. Suspended below the table is a supporting bracket 4 on which is a vertically adjustable support 5, this support having a base portion 6 on which the glass A is set in an inverted position. Positioned over the opening 3 is a mold 7 comprised of three parts, designated 7a, 7b and 7c. The mold parts are pivoted, as shown, so that they may be opened, there being a locking pin 8 for controlling the opening and closing of this mold. The general arrangement of mold parts is similar to that commonly provided in glass working machinery. The mold sections are provided with undercut portions 9 for cooperation with a dove-tailed rib or flange 10 on the table 2, the purpose of this arrangement being to provide an interlock between the mold and the table to prevent the mold from lifting off the table during the operation of the mold.

Set into the top of the mold is a shell 11, this shell having a central portion 11a and an annular side flange 11b. The central part 11a projects down into the mold 7, and is of less diameter than the internal cavity of the mold so as to provide an annular space 12 between the mold and the central portion 11a of the shell 11, this cavity confirming to the size and shape of the part which is to be applied to the glass or other object A. In the bottom of the shell 11 are one or more gates 13. In Figs. 1 and 2 we have shown two such gates. The interior of the shell 11 provides a recess 11c for the reception of molten glass. In Fig. 1 we have shown the parts in their position at the end of a molding operation, and in this view 14 designates a pressing plunger carried on the reciprocating head of an ordinary glass press, not shown, the plunger being of a diameter such that it will enter the recess 11c. The plunger is provided with a sealing ring 15, such as is commonly provided on glass presses, this sealing ring being adapted to seat in a recess 16 in the top of the shell 11 and prevent the escape of glass from the space between the plunger and the inside of the shell 11. This sealing ring 15 is adapted to be suspended by bolts, not shown, from the reciprocating head of the press, as will be well understood by those skilled in the art.

In the operation of the device shown in Fig. 1, the tumbler or other hollow object A is placed on the supporting base 6, and the member 5 is then rotated, causing the object A to be raised vertically by reason of the cooperating threads on the members 4 and 5. When the glass is so positioned, the bottom of the glass extends up into the mold, and it serves to close the bottom of the annular cavity 12.

In carrying out the invention, the entire unit is preferably heated so that when molten glass comes into contact with it the glass will not be too quickly chilled and the glass which is used is heated to a temperature higher than that at which glass is ordinarily worked, so that the glass will be more fluid and will remain fluid for a longer period of time. The gob of the highly heated glass is placed in the recess 11c provided in the shell 11, and the plunger 14 is then lowered into the recess. The plunger forces the highly fluid glass through the gates 13 into the mold cavity 12. In this cavity the glass flows around and fills the cavity, the glass at the same time fusing to the bottom of the previously formed tumbler or other object A. There is thus formed on the base of the tumbler an annular flange or foot corresponding in dimension and shape to the dimension and shape of the cavity 12 and this flange or base is preferably of a glass of a different color or character than the glass of the article A, the invention finding its utility in the application of contrasting glass to a previously formed object.

For example, the object A may be of clear glass, while the flange which is cast or extruded onto the bottom of the object A in this way may be blue or red, or of any other contrasting nature. After the glass in the mold has chilled, the ring 11 is tapped, only a light blow being necessary, and the sprue or small body of glass in the gate 13 breaks at the point where it joins to the flange which has been formed on the base of the object. The mold is then opened and the glass A with its contrasting base is removed. By heating the base to a slight extent, the rough place formed by the breaking away of the sprue can be smoothed off.

After the extruding operation has been finished a body of glass will remain inside the shell 11, and this has to be taken out and can be remelted.

According to this arrangement, the mold and shell 11 together provide a mold unit which forms the cavity 12, and the glass is forced or extruded under pressure into this cavity. It will be seen that in this particular article the part that is applied to the bottom of the glass contacts only with the edge of the glass and that the bottom of the tumbler itself is not colored or covered by the colored glass which forms the base flange.

The arrangement just described illustrates the manner in which a ring or flange or other decoration can be put around the base of a previously formed object where the part of contrasting color is in the nature of a ring or flange. Frequently it is desirable to form vertically extending ribs or flutes of contrasting color on the sides of an object, these flutes providing also feet for supporting the object.

Figure 5:
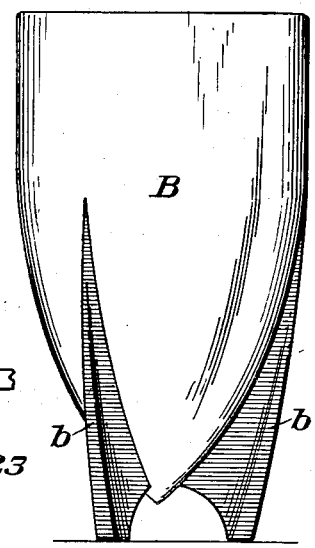
Figure 5 is a side elevation of the completed glass object.
Figure 3:
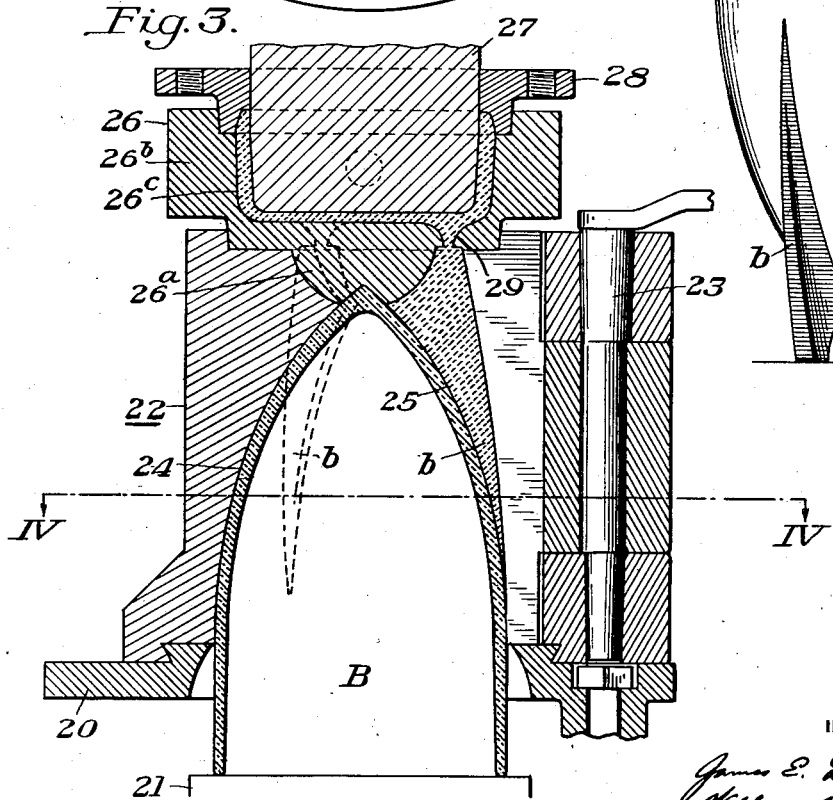
Figure 3 is a view similar to Fig. 1 showing an arrangement for putting a fluted type of decoration or foot onto a glass body.

In Figs. 3 and 4 we have shown how our invention is adapted to the application of this type of decoration. Fig. 5 shows the object B, and b designates the vertically extending flutes of glass of contrasting color, these flutes or ribs projecting beyond the end of the object B and forming feet. For effecting this type of decoration we have shown a table or support 20 similar to the table 2 of Fig. 1. At 21 there is conventionally illustrated a supporting pedestal or base for the object B, the member 21 being similar to the member 6. Carried on the table 20 and connected thereto by the dove-tailed arrangement similar to that shown and described in connection with Fig. 1 is a three-part mold 22, the three parts being designated 22a, 22b and 22c, these parts being pivotally connected together, the mold pin 23 controlling the opening and closing of the mold. The interior of the mold is provided with a recess 24 conforming to the contour of the object B, and formed in the walls of the sections are recesses 25 corresponding in depth to the height of the ribs b to be formed on the glass object.

As shown in Fig. 4, the recesses 25 are formed at the places where the mold sections meet so as to facilitate the removal of the completed object from the mold. Setting on top of the mold 22 and forming a part thereof is a shell 26, the shell 26 being generally similar to the shell 11 described in connection with Fig. 1, this shell having a bottom portion 26a which projects down in between the upper part of the divided mold 22, and which engages the end of the object B and which has an annular flange 26b, the shell providing in its upper portion a recess 26c to receive molten glass. The plunger of the press is designated 27, and 28 designates the sealing ring corresponding to the ring 15 of Fig. 1.

In the use of this apparatus, the previously formed object B is mounted on the support 21 so as to be held in the recess 24 in the mold. The portions of the object B to be ornamented form, as in Fig. 1, a confining wall for the cavities or recesses 25. The shell 26 is provided with a gate 29 leading into each recess 25. When the glass object B has been positioned in the mold, the highly heated fluid glass of contrasting color is dropped into the recess 26c, and the plunger 27 is operated to force or extrude the molten glass through the gates 29 into the several recesses 25. The glass flows into these recesses, filling them, and at the same time fusing to the object B, thus forming on the object B the ribs or flutes *b* shown in Fig. 5. When the glass has chilled, the shell 26 is tapped, causing the sprues in the gates 29 to break, and the article can then be removed from the mold and the rough places which may result from the breaking off of the sprues can be smoothed by heating the object to fire polish it.

While it has heretofore been a simple matter to form an object similar in shape to the object shown in Fig. 5 by forming the ribs *b* of glass of the same color as the body of the object, and by forming them in the same mold and at the same time that the body is formed, it has heretofore been a very expensive and difficult procedure to form the parts *b* of glass of contrasting color.

The present invention provides a relatively simple and cheap way of making the parts *b* of glass of different color on a commercially practical scale.

Frequently it is desirable to place bands of contrasting color around the exterior of a hollow glass object for the purpose of ornamenting it. Fig. 6 illustrates an adaptation of our invention to the application of this type of ornamentation. In this figure 32 designates a supporting table on which is a two-part mold 33, the two parts being hinged by means of the pin 34 and being held together by means of a pin 35. This mold has an interlocking part which dovetails with an upstanding flange on the table 32 for holding the mold in place on the table. Within the mold is a cavity 36 adapted to receive the object to be ornamented. In Fig. 6 this object or article is designated 37. Formed in the walls of this cavity are annular recesses 38 of a width and depth corresponding to the size of the ornamental band or bands which are to be applied to the object. We have shown these grooves or recesses 38 as being positioned near the middle of the object 37, and we have shown a similar recess 39 at the base of the glass 37. In the meeting faces of the mold sections there are vertical gates 40 which communicate through lateral passages with the grooves or recesses 38 and 39, the lateral connecting passages or gates being designated 41. Formed in the top of the mold 33 is a recess 42, and the vertical gates 40 communicate with this recess.

In using the device, the mold is heated, as previously described; the object to be ornamented is positioned in an inverted position in the mold cavity 36, and a gob of highly heated fluid glass is placed in the recess 42 and a plunger 43 with its mold ring 44 is immediately entered into the recess, forcing the glass down the gates 40 and through the lateral gates 41 into the recesses 38 and 39. The glass flowing under pressure fills the recesses 38 and 39 and at the same time fuses to the glass object 37. When the glass in the mold has cooled the mold is opened. Since the gates 40 and 41 are in the plane of the meeting faces of the two mold parts, the mold can be opened and the solidified glass taken out of the gates 40 and 41 for remelting, the sprues forming in the passages 41 being easily broken by a slight blow or jar and the places where the sprues are broken away can be removed by heating to a point where the surface tension of the glass causes the ruptured surface to smooth over, according to what is known as "fire polishing".

When the object is completed it has the appearance shown in Fig. 6a in which the object 37 has the ornamental bands 45 thereabout, these bands contrasting in color to the main body of the object 37.

It will be understood that the number and location of the bands 45 can be modified and varied, the particular arrangement shown being merely for the purpose of illustration.

It will be noted that in the arrangement shown in Fig. 6 the recess for the molten glass is formed directly in the top of the mold, the receiving shell being unnecessary with this type of mold construction.

In Figs. 7 and 8 we have illustrated the adaptation of our invention to the application of a bead or flange around the open end of a hollow glass object, as for instance, a tumbler or vase. In these views, 52 designates a supporting table or bench on which is carried a two-part mold 53, this mold having an interlocking engagement with the base and having a cavity 54 to receive the upper edge of the object 55 to be decorated. The top of the divided mold 53 is recessed to receive a shell 56, this shell having a bottom portion 56a and an annular flange portion 56b, there being a recess 56c in the shell for the reception of molten glass. The inside of the mold 53, where it contacts with the portion of the object to be decorated, is provided with an annular groove or recess 57. The bottom 56a of the shell 56 is supported from the side portion thereof in the manner of a spider, there being a substantially annular space, as shown in Fig. 8, between the central bottom portion 56a and the surrounding portion of the shell 56, narrow webs or bridges 58, being provided to connect these parts of the shell 56. The arrangement is such that the spider portions 58 do not extend down flush with the lowermost surface of the part 56a, but as shown in Fig. 7, terminate above a plane at the bottom of the portion 56a so as to form a continuous channel 57a, forming in effect a vertical continuation of the recess 57.

In the use of this equipment, the mold is heated and the highly heated fluid glass is dropped into the shell 56 and then pressed by the plunger 59, the glass being forced through the spaces around the bottom part 56a into the recess 57 and its upstanding extension 57a so as to form on the lip of the glass 55 a bead which projects vertically above the top of the object 55. When the shell 56 is jarred, the glass tends to break in the plane of the dotted line indicated in Fig. 7 so as to permit the decorated object to be removed from the mold.

In the previous embodiments of our invention we have described the formation of a base of contrasting color to a previously formed object or to the application of a decoration thereto. Our invention is applicable also to the formation of other parts of the receptacle, and in Figs. 9 and 10 we have illustrated its adaptation to the forming of a handle of a different colored glass on a previously formed receptacle.

It is to be understood that the term "ornamentation" or "portion of contrasting color", or like designations as used herein or as used in the appended claims shall include handles, bases, beads, or base portions, or other devices which are either peculiarly ornamental or which are supplemental to the main body of the object.

Figure 9:
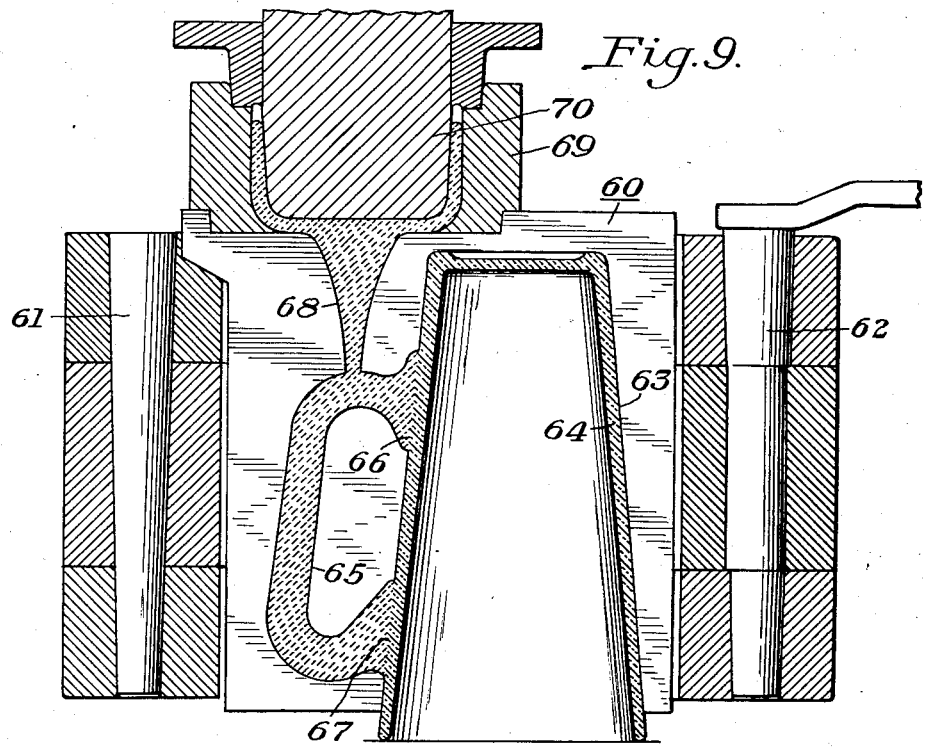
Figure 9 illustrates the invention as applied to the forming of handles of contrasting color or material on tumblers or other hollow objects, the view being a section similar to Fig. 1.
Figure 10:
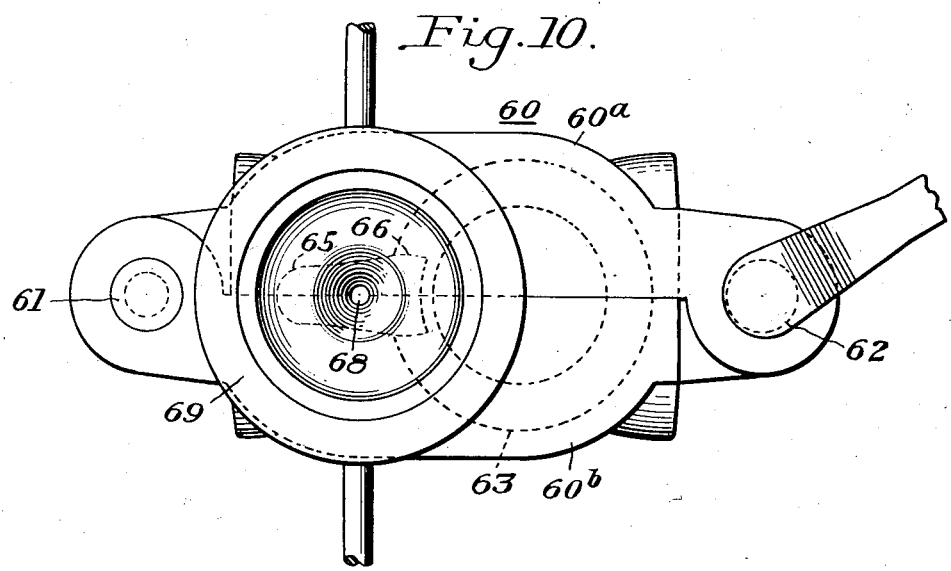
Figure 10 is a top plan view of the apparatus shown in Fig. 9, the extruding plunger being withdrawn from the glass receiver.

In Fig. 9 we have shown a mold 60 comprised of two parts 60a and 60b pivotally connected at 61 and provided with a locking pin 62. Within the mold sections is a cavity 63 for receiving a hollow glass object 64. Formed in the meeting surfaces of the two mold sections is a cavity or recess 65 of the shape and dimension of a handle, this cavity or recess opening into the main cavity 63 at two places, 66 and 67. It will be seen that when the object 64 is in place in the cavity 63 it forms a confining wall for the portions 66 and 67 of the cavity 65. Formed in the faces of the meeting sections of the mold and communicating with the cavity 65 is a gate 68 that opens at the top of the mold. The top of the mold is recessed to receive a shell 69. In the use of this apparatus, the mold is, as in the other embodiments, heated to a substantial temperature, and the object 64 is placed in the mold cavity. The highly fluid colored glass for forming the handle is dropped into the receiving shell 69 and the pressing plunger 70 is then forced into the open top of this shell, causing the glass to flow under pressure down the gate 68 and into the cavity 65. Where the glass contacts at 66 and 67 with the outside of the object 64, it fuses thereto. When the glass has solidified, the shell 69 is not loose and the mold is opened and the sprue 68 is broken off, after which the point where the sprue existed can be smoothed by heating.

The various embodiments as thus described show the manner in which molten glass may be placed in a receptacle at the top of the mold structure and forced under pressure through an opening or gate into a mold cavity, one confining wall of which cavity is formed by the object to be ornamented or supplemented, whereby the molten glass coming into the cavity may fill the cavity and at the same time fuse onto the wall of the glass object with which it contacts, and thus form on such object a handle, a base portion, or an ornamental bead or rib of any suitable or preferred type, or otherwise complete the partially formed body of the object. The advantages of the invention reside in the application of such ornamental or supplemental parts to an object by the use of pressure and without requiring that such other parts be separately formed, and then applied by hand, and in which the formation of decorated objects of this nature can be made much more cheaply and uniformly than has been possible by other methods.

It will be understood that the various specific arrangements illustrated and described are for the purpose of illustrating the nature of our invention and that the invention is not restricted to the particular construction and arrangement of parts herein specifically shown.

We claim:

1. The method of making glassware having a body portion and a supplemental annular peripheral portion which contrasts in color with the body portion, which comprises placing the previously formed body portion of the article in a heated mold, the mold having a recess therein providing a cavity corresponding in shape to such annular peripheral supplemental part and in such manner that the portion of the body to which the supplemental part is to be applied forms a confining wall of the cavity, thereafter injecting a highly heated fluid glass into the cavity under pressure and at a plurality of points simultaneously to fill the cavity and cause the fluid glass to fuse onto the wall of the body of the object with which it contacts and at the same time the glass is being shaped in the cavity, severing the excess glass from the peripheral supplemental portion so formed after the glass has cooled and while the article remains in the mold, and removing the object with the attached supplemental part after the glass in the cavity has chilled.

2. Apparatus for applying a supplemental glass portion to a previously formed glass object, comprising a mold adapted to receive that portion of the previously formed glass object to which the supplemental part is to be applied, said mold having a recess therein forming a cavity of the shape of the supplemental portion which is to be formed, said recess being so formed that the portion of the glass object received in the mold forms a confining wall for the recess, a glass receiver removably seated on the mold, said mold having a passage leading from the receiver into said recess, and means for exerting a pressure on the glass in the receiver for forcing it into the recess, said glass receiver being mounted on the mold in such manner that it may be moved as a unit relatively to the mold while the glass remains in the recess to sever the solidified glass at the point where said passage opens into said recess, whereby excess glass may be broken away from the supplemental part which has been formed before the completed article is removed from the mold, and whereby the severing action occurs while the supplemental portion is confined by the walls of the mold.

3. Apparatus for applying to a previously formed glass object a supplemental portion of contrasting color, comprising a mold, said mold having a cavity therein corresponding in shape to the supplemental portion to be added to the previously formed glass object, said mold having an independently rotatable and movable glass receiver thereon into which the cavity opens for receiving the previously formed glass object, said mold having a passageway opening into the cavity and through which molten glass may be introduced into the cavity from said receiver, and means for forcing molten glass under pressure from the receiver through the passageway into the cavity, said glass receiver being mounted on the mold in such manner that it may be moved as a unit relatively to the mold while the glass remains in the recess to sever the solidified glass remaining in said passage at the point where such passageway opens into the cavity.

4. Apparatus for applying a supplemental portion to a previously formed glass object, comprising a divided mold having a main recess to receive that portion of the glass object to which the supplemental portion is to be applied, said mold having a cavity therein corresponding to the shape of the supplemental portion to be formed and opening into said first recess, the mold having another recess in the top thereof, a glass receiver associated with the mold and set into said last named recess, and a gate leading from the receiver to said cavity, said gate being formed in the meeting faces of the mold parts.

5. Apparatus for applying a supplemental portion to a previously formed glass object, comprising a divided mold having a main recess to receive that portion of the glass object to which the supplemental portion is to be applied, said mold having an annular cavity therein around the interior of said recess corresponding to the shape of the supplemental portion to be formed and opening into said first recess and transverse to the plane of division of the mold, a glass receiver associated with the mold, a gate leading from the receiver to said annular cavity, said gate being formed in the meeting faces of the mold parts, and a plunger arranged for cooperation with the receiver for applying pressure to glass in the receiver.

6. Apparatus for applying an ornamental portion of contrasting color to a previously formed glass object, comprising a sectional mold having a main recess for receiving at least a portion of the body of the previously formed object and having an annular cavity therein corresponding to the shape of the ornamental portion to be applied to the object and extending entirely around said recess, said cavity opening into such main recess continuously around the interior thereof in such manner that when the previously formed object to be decorated is placed in the recess it forms a wall for the cavity, a receiving shell associated with the mold and providing a receptacle for receiving molten glass, and gates leading from the receiving shell into said cavity at a plurality of points.

7. Apparatus for applying an ornamental portion of contrasting color to a previously formed glass object, comprising a sectional mold having a main recess for receiving at least a portion of the body of the previously formed object and having a cavity therein corresponding to the shape of the ornamental portion to be applied to the object, said cavity opening into such main recess in such manner that when the previously formed object to be decorated is placed in the recess it forms a wall for the cavity, a separate receiving shell set into the top of the mold and providing a receptacle for receiving molten glass, a gate in the shell leading from the receiving shell into said cavity, said gate being of relatively small cross-sectional dimension, where it opens into the cavity whereby severance of the glass in the ornamental portion from the glass in the gate can be effected by movement of the shell after the glass is chilled and before the mold is opened, and means for exerting pressure on fluid glass placed in the shell.

8. Apparatus for applying an ornamental portion of contrasting color to a previously formed glass object, comprising a sectional mold having a main recess for receiving at least a portion of the body of the previously formed object and having a cavity therein corresponding to the shape of the ornamental portion to be applied to the object, said cavity opening into such main recess in such manner that when the previously formed object to be decorated is placed in the recess it forms a wall for the cavity, a separate receiving shell associated with the mold and providing a receptacle for receiving molten glass, a gate leading from the receiving shell into said cavity, said gate being of relatively small cross-sectional dimension, and means for exerting pressure on fluid glass placed in the shell, said shell also forming a part of the cavity in cooperation with the said sectional mold.

JAMES E. DUNCAN, Jr.
WILLIAM W. REESE.